US009135144B2

(12) United States Patent  
Matei et al.

(10) Patent No.: US 9,135,144 B2  
(45) Date of Patent: Sep. 15, 2015

(54) INTEGRATED CIRCUITS AND METHODS FOR DEBUGGING

(75) Inventors: Mihai Matei, Bucharest (RO); Mihail Nistor, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 415 days.

(21) Appl. No.: 13/500,691

(22) PCT Filed: Oct. 22, 2009

(86) PCT No.: PCT/IB2009/054685  
§ 371 (c)(1),  
(2), (4) Date: Apr. 6, 2012

(87) PCT Pub. No.: WO2011/048442  
PCT Pub. Date: Apr. 28, 2011

(65) Prior Publication Data  
US 2012/0204067 A1    Aug. 9, 2012

(51) Int. Cl.  
*G06F 9/44* (2006.01)  
*G06F 11/36* (2006.01)  
*G06F 11/14* (2006.01)

(52) U.S. Cl.  
CPC .......... *G06F 11/3624* (2013.01); *G06F 11/142* (2013.01)

(58) Field of Classification Search  
CPC .................................. G06F 11/3664–11/3696  
USPC ......................................................... 717/124  
See application file for complete search history.

(56) References Cited

U.S. PATENT DOCUMENTS

| | | | | |
|---|---|---|---|---|
| 6,219,830 | B1 * | 4/2001 | Eidt et al. | 717/139 |
| 6,223,208 | B1 * | 4/2001 | Kiefer et al. | 718/108 |
| 6,260,150 | B1 * | 7/2001 | Diepstraten et al. | 713/323 |
| 6,687,899 | B1 * | 2/2004 | Shann | 717/162 |
| 6,986,141 | B1 * | 1/2006 | Diepstraten et al. | 718/108 |
| 7,020,768 | B2 * | 3/2006 | Swaine et al. | 712/228 |
| 7,353,508 | B2 * | 4/2008 | Bowers et al. | 717/162 |
| 7,401,210 | B2 * | 7/2008 | Grisenthwaite et al. | 712/242 |
| 7,421,694 | B2 * | 9/2008 | Gosalia et al. | 718/104 |
| 7,716,651 | B2 * | 5/2010 | Cukierman et al. | 717/130 |
| 7,793,261 | B1 * | 9/2010 | Edwards et al. | 717/124 |
| 8,079,019 | B2 * | 12/2011 | Lindo et al. | 717/129 |
| 8,214,845 | B2 * | 7/2012 | Hoover et al. | 718/108 |
| 9,047,093 | B2 * | 6/2015 | Gelinas et al. | 1/1 |

(Continued)

OTHER PUBLICATIONS

Pin: Building Customized Program Analysis Tools with Dynamic Instrumentation Chi-Keung, Luk Robert, Cohn Robert , Muth Harish Patil, Artur Klauser, Geoff Lowney, StevenWallace, Kim Hazelwood—Intel Corporation, Vijay Janapa Reddi—University of Colorado—PLDI'05 Jun. 12-15, 2005, Chicago, Illinois, USA.*

(Continued)

*Primary Examiner* — Lewis A Bullock, Jr.  
*Assistant Examiner* — Francisco Aponte

(57) ABSTRACT

A method for identifying a current context during execution of application program code. The method comprises the steps of retrieving static context information for the application program code, identifying at least one active section of the application program code loaded in physical memory; and identifying a current context based at least partly on the at least one identified active section and retrieved static context information.

12 Claims, 4 Drawing Sheets

(56) References Cited

U.S. PATENT DOCUMENTS

| | | | |
|---|---|---|---|
| 2002/0138748 A1* | 9/2002 | Hung | 713/190 |
| 2003/0226001 A1 | 12/2003 | Moyer et al. | |
| 2004/0267485 A1 | 12/2004 | Penov et al. | |
| 2005/0165597 A1* | 7/2005 | Nightingale | 703/27 |
| 2006/0031555 A1* | 2/2006 | Sikdar et al. | 709/231 |
| 2006/0200834 A1* | 9/2006 | Cukierman et al. | 719/328 |
| 2006/0224866 A1* | 10/2006 | Grisenthwaite et al. | 712/226 |
| 2009/0210682 A1* | 8/2009 | Gelinas et al. | 712/228 |
| 2010/0293342 A1* | 11/2010 | Morfey et al. | 711/154 |

OTHER PUBLICATIONS

Pin: Building Customized Program Analysis Tools with Dynamic Instrumentation—Chi-Keung Luk, Robert Cohn, Robert Muth, Harish Patil, Artur Klauser, Geoff Lowney, Steven Wallace, Kim Hazelwood—Intel Corporation; Vijay Janapa Reddi—University of Colorado—PLDI'05 Jun. 12-15, 2005, Chicago, Illinois, USA.*
International Search Report and Written Opinion correlating to PCT/IB2009/054685 dated Jul. 22, 2010.

* cited by examiner

INTEGRATED CIRCUITS AND METHODS FOR DEBUGGING

FIELD OF THE INVENTION

The field of the invention relates to an integrated circuit comprising a debugging module and a method therefor. In particular the field of the invention relates to a method for identifying a current context during execution of application program code, a method for determining context information during execution of application program code, and an integrated circuit comprising a debugging module.

BACKGROUND OF THE INVENTION

Software applications that are intended to be run without an operating system (OS) are often referred to as 'bareboard systems'. In the Executable and Linkable Format (ELF) common standard file format, first published in the System V Application Binary Interface specification (System V being a version of the UNIX™ operating system originally developed by AT&T™, and later in the Tool Interface Standard, the object file type (e_type) for such applications is "executable file", as opposed to, for example, "relocatable file" or "shared object file". Accordingly, within the ELF standard, such applications cannot use shared object files, such as shared libraries, or independent relocatable files (e.g. relocatable modules loaded by an operating system).

A problem with such applications is in the enabling of a debugger to correctly identify a current debugging context for the application, for example source mapping, variables view, breakpoint location, etc. In particular, without the ability for the debugger to correctly identify a current context, it is not possible to accurately detect the source information for code that is relocated.

Applications that comprise bareboard systems can be divided into two types: those that have context switches when the application is run, and those that do not. A context switch may be considered to take place, for example, when a section of memory (in a form of a code or data) is relocated, e.g. when a section of code is copied, or 'mapped' into program (physical) memory and becomes 'active', and the execution of the application continues from the new location where the code was copied in memory. Additionally, a context switch may be considered to take place when a Memory Management Unit (MMU) configuration is changed. For example, an MMU configuration change may take place when any information regarding the MMU, for example such as information held in the Translation Lookaside Buffer (TLB), MMU registers, etc., (depending on MMU design) is updated.

In the case of bareboard system applications that do not have context switches when the application runs, debugger information generated by the compiler is typically sufficient to identify a current debugging context, since there is no change of context during the application. Accordingly, all memory spaces are visible throughout the running of the application, and therefore hardware and software breakpoints are always valid.

In the case of bareboard system applications that have context switches when the application runs, since such applications run without an operating system, the applications themselves act as small operating systems in order to perform the context switches. For some applications, the compiler/linker therefor may generate debugger information for some context switches (overlay support). With such overlay support, the compiler/linker (sometimes referred to as an overlay manager) generates debugger information when the code and data are copied into program memory, thereby allowing the application to be compiled without position independent code and data. For example, the overlay manager may define variables for supporting overlay debugging, such as an overlay mapped address, an overlay load address, the size of the overlay, a flag indicating whether the overlay is currently mapped, etc. Such overlay support enables context switches resulting from different overlay sections of code/data being loaded into program memory to be identified by a debugger. Furthermore, the overlay manager may define a function that, if called, enables a debugger to set a breakpoint at that point. In this manner, the overlay manager may cause this function to be called whenever the overlay table is changed, enabling the debugger to keep track of those overlays that are currently mapped into program (physical) memory, and update any breakpoints that may be set accordingly.

Whilst an overlay manager may provide information relating to context switches resulting from the use of overlays, it does not provide information relating to context switches resulting from MMU configuration changes. In addition, such overlay support is not always available or appropriate. For example when an overlay section is relocated to two different memory locations, that overlay section will require two different overlay mapped address values, which cannot be supported by an 'overlay mechanism', per se. Furthermore, an overlay table (e.g. the_GNU ovly_table variable) may not be placed in read-only memory, because the overlay manager requests an update of this table whilst the application is running. Without such overlay support being provided by the overlay manager, the application is required to be compiled with position independent code and data, since the compiler/linker only generates debugger information for the original location code and data. The use of such position-independent code and data means that the debugger is unable to identify a current context without additional information.

Typically, in order to enable a debugger to correctly identify a current context for such an application comprising context switching, where overlay support is not available, a user is required to manually set the correct debug context for each MMU configuration change and code relocation. This approach is very difficult because the user (debugger) needs to know the specifics of the code she/he is debugging, and typically the user (debugger) is not one of the architect engineers that is responsible for writing the application being debugged.

Furthermore, since the number of hardware breakpoints that can be set at any one point is limited (depending on the specific hardware implementation), event points that make use of hardware breakpoints should not be set for an area of RAM (Random Access Memory) when that area of RAM has not been initialised and the relevant application code has not been relocated yet, and such breakpoints should be removed when the context becomes invalid.

SUMMARY OF THE INVENTION

The present invention provides a method for identifying a current context during execution of application program code, a method for determining context information during execution of application program code, and an integrated circuit comprising a debugging module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
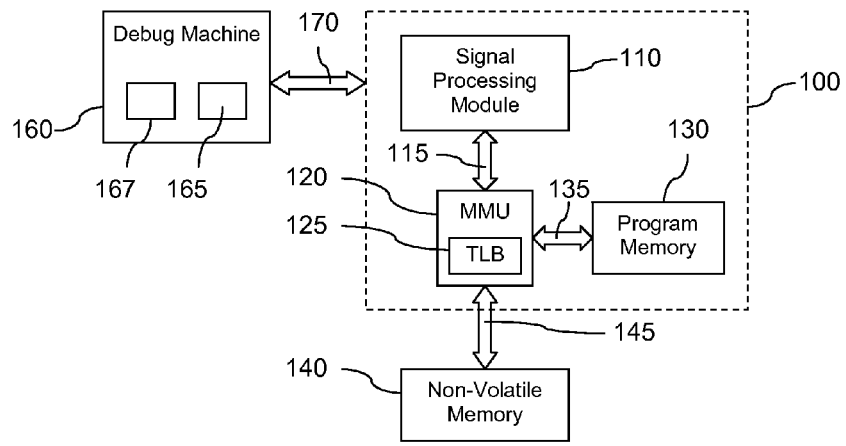
FIG. 1 schematically illustrates a simplified example of a signal processing system.

Referring now to FIG. 1, there is illustrated a simplified example of a signal processing system 100. Because the apparatus implementing the present invention is, for the most part, composed of electronic components and circuits known to those skilled in the art, circuit details will not be explained in any greater extent than that considered necessary as illustrated below, for the understanding and appreciation of the underlying concepts of the present invention and in order not to obfuscate or distract from the teachings of the present invention. Furthermore, only those components and circuits deemed necessary for describing the inventive concept are illustrated, with other known components and elements being omitted for clarity.

The signal processing system 100 comprises a signal processing module 110 arranged to execute program instructions, for example in a form of application program code and the like. For clarity, the term 'application program code' used herein may refer to instructions to be executed by signal processing logic as well as to data that may be used during the execution of such instructions. The signal processing module 110 is operably coupled to a Memory Management Unit (MMU) 120, for example via a virtual bus 115. The MMU 120 handles accesses to memory received from the signal processing module 110, and performs functions such as translating virtual addresses of the received accesses to physical addresses; memory protection, cache control, etc. For the illustrated example, the MMU 120 comprises a Translation Lookaside Buffer (TLB) 125, which the MMU 120 uses to translate virtual addresses to physical addresses.

The MMU 120 is operably coupled to at least one program memory element 130, for example via bus 135. The at least one program memory element 130 comprises writeable memory such as cache memory, RAM (Random Access Memory), flash memory, etc. The MMU 120 is further operably coupled to at least one non-volatile memory element 140, for example via bus 145. The at least one non-volatile memory element 140 may comprise any suitable form of non-volatile memory, for example ROM (Read Only Memory), flash memory, a magnetic storage device such as a hard disk drive, an optical storage device such as a compact disk (CD) or digital versatile disk (DVD), etc.

Figure 2:
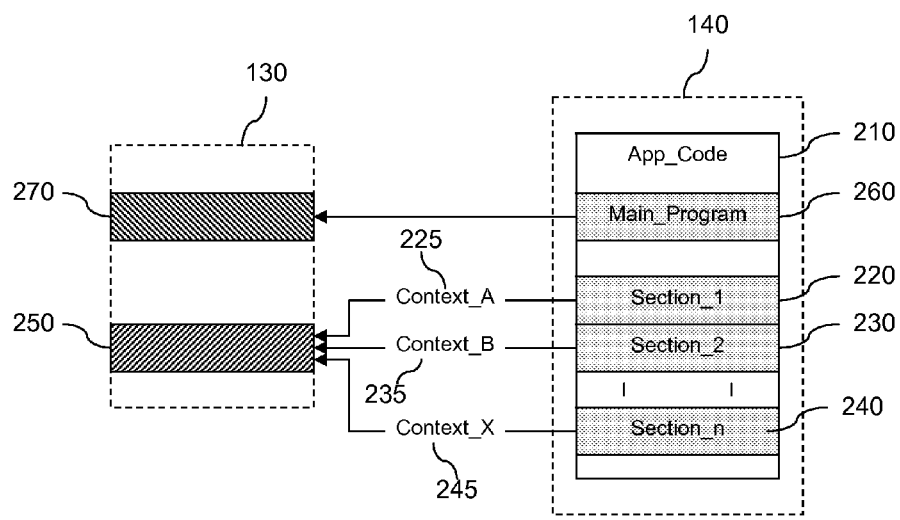
FIG. 2 schematically illustrates an example of memory management.

Referring now to FIG. 2, there is illustrated an example of memory management, such as may be performed by the MMU 120 of FIG. 1. Application program code, such as application program code 210, is stored within non-volatile memory element 140. When program instructions are to be executed by signal processing module, such as signal processing module 110 of FIG. 1, the MMU 120 of FIG. 1 loads the required program instructions into the program memory 130. Due to restrictions in the physical size of the program memory element 130, it is often the case that there is insufficient physical memory in the program memory element 130 to concurrently load all program instructions and data relating to a single application into the program memory element 130. Accordingly, it is known to divide application code into sections, whereby only those sections that are currently required to be executed need be loaded into program memory 130.

For example, in FIG. 2 the application program code 210 comprises a main program code section 260 and a plurality of auxiliary sections 220, 230, 240. The main application code section 260 is loaded into the program memory element 130 at a physical location 270 therein, from where the main application code section 260 may be fetched and executed by the signal processing module 110. Initially, only the main application code section 260 may be loaded into the program memory element 130, creating an initial context for the signal processing system 100.

During execution of the application program code 210, a call may be made by the signal processing module 110 to code within, say, the first auxiliary section, Section_1 220. Accordingly, the MMU 120 loads (relocates) Section_1 220 into the program memory element 130 at a physical location 250 therein. This causes a first context switch, Context_A 225, for the signal processing system 100, whereby both the main program code section 260 and the first auxiliary section, Section_1 220, are loaded into the program memory element 130.

A call may subsequently be made by the signal processing module 110 to code within, say, the second auxiliary section, Section_2 230. Accordingly, the MMU 120 loads (relocates) Section_2 230 into the program memory element 130. If the code within sections 220, 230, 240 is not required to be executed substantially concurrently, then there is no need for more than one of the sections to be loaded into program memory element 130 at any one time. Accordingly, they may be loaded into the same physical location 250 within the program memory element 130, thereby effectively overwriting, or overlaying as it is often referred as, previously loaded code within that location 250. Thus, for the illustrated example, when the MMU 120 relocates Section_2 230 into the program memory element 130, it relocates Section_2 230 into the program memory element 130 at location 250, thereby overwriting Section_1 220 previously loaded therein, and causing a second context switch, Context_B 235, for the signal processing system 100. Similarly, if a call is subsequently made by the signal processing module 110 of FIG. 1 to code within Section_n 240, the MMU 120 may load (relocate) Section_n 240 into the program memory element 130 at location 250, thereby overwriting code previously loaded therein, and causing a further context switch, Context_X 245.

In order for such applications comprising context switches to be effectively debugged, it is necessary for debugging modules to be able to correctly identify a current context for the application in order to be able to identify the current source mapping, variables view, breakpoint location, etc. In particular, without the ability for the debugger module to correctly identify a current context, it is not possible to accurately detect the source information for code that gets relocated.

Referring back to FIG. 1, there is illustrated an example of a debugger module 160 for providing debugging functionality during execution of application program code within a signal processing system. For the illustrated example, the debugging module 160 comprises a signal processing module 165 arranged to perform debugging functionality. For example, the signal processing module 165 may be arranged to run debugger software thereon such as the GNU Project Debugger, usually referred to as GDB (further details of which may be found at http://www.gnu.orq/software/qdb/). In use, the debugging module 160 is operably coupled to a signal processing system for which debugging is to be performed, such as signal processing system 100, via a debug interface 170. Such a debug interface 170 may be implemented in any suitable manner, such as comprising a TCP/IP (transport control protocol/internet protocol) interface, or a serial interface, etc.

For the illustrated example, the signal processing module 165 of the debugging module 160 is arranged, upon receipt of an event notification for example from the signal processing system 100 via the debug interface 170, to determine a current context for the signal processing system 100, and to determine whether the received event notification relates to a context switch event. If it is determined that the received event notification relates to a context switch event, the signal processing module 165 is then arranged to update context information based at least partly on the determined current context. In this manner, the debugging module 160 is able to identify when a context switch has taken place, in order to identify the context to which the signal processing system 100 has switched, and to update context information in order to enable the debugging module 160 to trace subsequent context switches. Thus, the debugging module 160 is able to identify the current source mapping, variables view, breakpoint location, etc.

Figure 3:
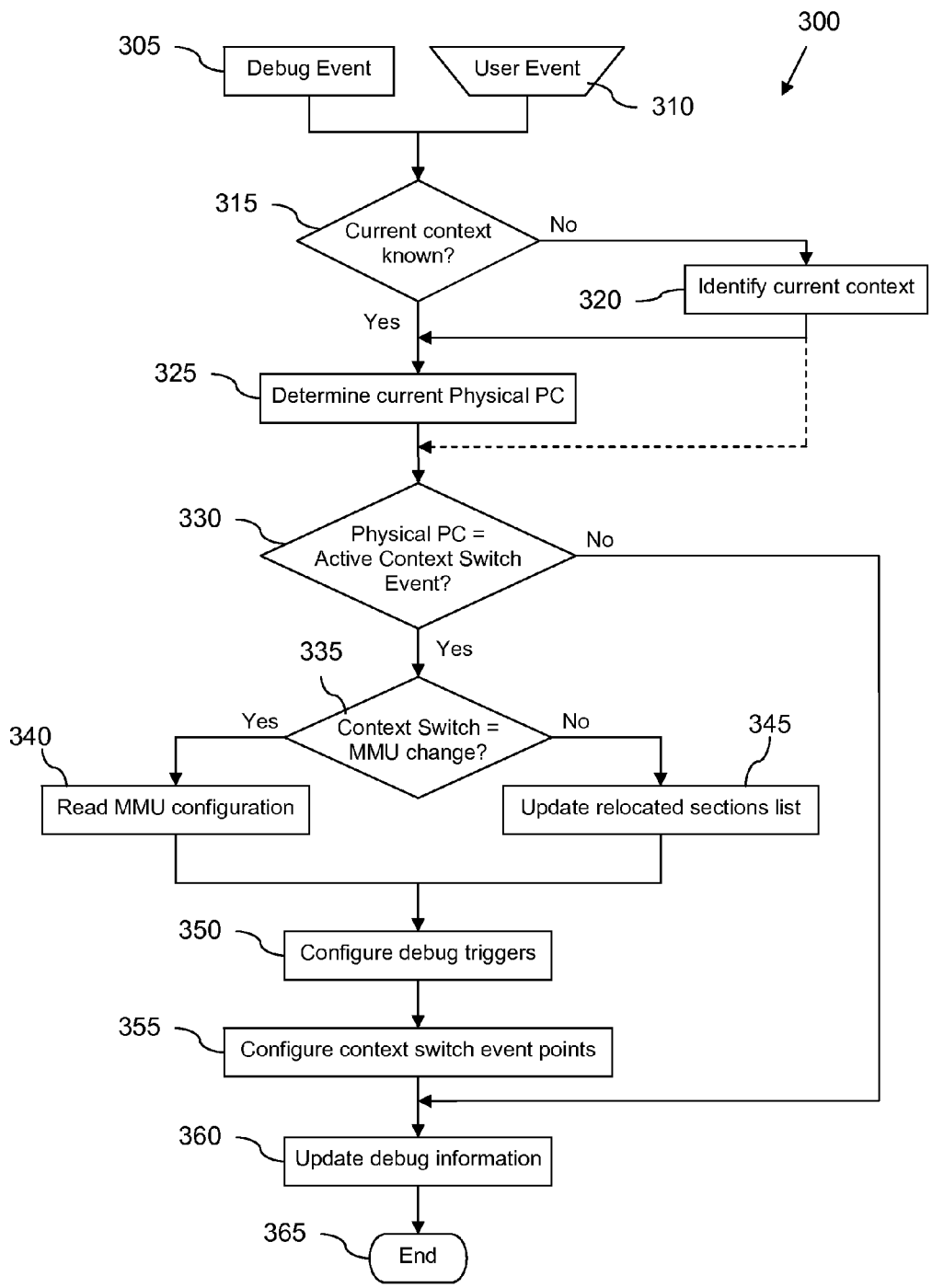
FIG. 3 illustrates a simplified flowchart of an example of a method for determining context information during execution of application program code.

Referring now to FIG. 3, there is illustrated a simplified flowchart 300 of an example of a method for determining context information during execution of application program code. For example, the method of FIG. 3 may be implemented by signal processing module 165 of debugging module 160 by way of computer-readable code stored within a computer-readable storage element such as memory element 167.

In summary, the method of FIG. 3 comprises receiving an event notification, determining a current (active) context of a signal processing system executing the application program code being debugged, determining whether the received event notification relates to a context switch event, and if it is determined that the received event notification relates to a context switch event, updating context information based at least partly on the determined current context.

More specifically for the illustrated example, the method starts with the receipt of an event notification, which for the illustrated example may be in a form of a debug event at step 305, such as a breakpoint or trigger event or the like configured within the signal processing system executing the application program code being debugged, for example signal processing system 100 of FIG. 1, or a user event at step 310. One example of a typical user event may involve the case when the user requests the debugger module to be attached to the signal processing system that is executed. Examples of such as an attachment type may comprise:

(i) resetting and stopping the signal processing system at the entry point of the application (where the entry point of the application is usually set at the software reset interruption); in this case the debugger module can always recognize the initial switch context (for example it may achieve this by comparing a current physical program counter with the physical link time address of the initial switch context);

(ii) attaching to a running signal processing system; in this case the debugger module is required to identify the current context when the user requests the debugger module to stop the signal processing system after the user has attached to the signal processing system.

Upon receipt of an event notification, the method moves on to determining a current context for the signal processing system that is executing the application program code being debugged. More specifically for the illustrated example, in step 315 it is determined whether the current (active) context for the signal processing system executing the application program code being debugged is known. For example, the current context may be known if a previous event notification has been received within the current context. If it is determined that the current context for the signal processing system executing the application program code being debugged is not known, the method moves on to step 320, where the current context for the signal processing system executing the application program code being debugged is identified, for example as described in greater detail below with reference to FIG. 4.

Having determined the current context for the signal processing system executing the application program being debugged, the method moves on to determining whether the received event notification relates to a context switch event. More specifically for the illustrated example, the method moves on to step 325, where a current physical memory program counter value for the signal processing system executing the application program code being debugged is determined. In accordance with some examples, the current physical memory program counter value for the signal processing system executing the application program code being debugged may be determined as a part of a step of identifying the current context of that signal processing system. Accordingly, it is contemplated that following step 320, the step of determining the current physical memory program counter value (step 325) may be bypassed, as illustrated by the dashed lines in FIG. 3.

After determining the current physical memory program counter value, the method moves on to step 330, where it is determined whether the physical memory program counter value matches a preconfigured current context switch event point. For example, a context switch event point may comprise an address in physical (program) memory for the current context at which a memory management (MMU) change occurs, or an address in physical (program) memory for the current context at which a context switch event occurs caused by a section of application program code being relocated (loaded) into program memory. Such addresses in physical (program) memory may be identified at the same time as identifying the current context, as described in more detail below.

If it is determined that the received event notification relates to a context switch event, the method moves on to updating context information. More specifically for the illustrated example, if it is determined that the received event notification relates to a context switch event in step 330, the method moves on to step 335, where it is determined whether the context switch event relates to a memory management (MMU) change or a section relocation. By way of example, such an MMU change may comprise a change to any MMU related information, such as information held within the Translation Lookaside Buffer (TLB) 125, MMU registers, etc. Context switch types may be identified as described in greater detail below.

If it is determined that the context switch event relates to an MMU change, the method moves on to step 340 where MMU configuration information is read. In this manner, the debugging module is able to keep track of changes to the MMU configuration, in order to identify the current source mapping, variables view, breakpoint location, etc. Conversely, if it is determined that the context switch event relates to a section relocation, it may be assumed that the context switch event relates to the loading (relocating) of one or more sections of application program code into physical memory (for example program memory 130 of FIG. 1). Accordingly for the illustrated example, the method of FIG. 3 moves on to step 345, where a relocated sections list is updated. In this manner, the debugging apparatus is able to keep track of relocated (active) sections of application program code in order to identify the current source mapping, variables view, breakpoint location, etc.

For the illustrated example, if it is determined that the received event notification relates to a context switch event, the method may further comprise the steps of configuring debug triggers in accordance with the current context in step 350, and configuring context switch event points accessible from the current context in step 355. In this manner, debug triggers and context switch event points implemented by way of, say, hardware breakpoints and the like need only be configured for the current context switch. When a context switch occurs, such hardware breakpoints and the like for the previous context may be removed, whilst hardware breakpoints and the like for the new context are configured. In this manner, limited hardware breakpoint resources available within the signal processing system may be more efficiently utilised during the debugging of application program code comprising context switches.

The method then moves on to step 360, where debug information is updated, for example by way of updating source mapping, variables etc. of the executed code. The method then ends at step 365. Referring back to step 330, if it is determined that the received event notification does not relate to a context switch event, the method simple moves straight to step 360, where the debug information is updated, and the method ends at step 365.

Referring back to FIG. 1, as previously mentioned, the signal processing module 165 of the debugging module 160 is arranged, upon receipt of an event notification, to determine a current context for the signal processing system 100. In accordance with one example, the signal processing module 165 is arranged to retrieve, for example from memory element 167, static context information for the application program code being debugged, to identify at least one active section of the application code loaded in physical memory of the signal processing system 100, for example the program memory element 130, and to identify a current context based at least partly on the at least one identified active section and retrieved static context information.

The static context information comprises static information (for example information that does not change during execution of the program application code or vary between executions thereof) from which context switch event points within the application program code may be identified. An example of such static context information is described in greater detail below with reference to FIGS. 5 and 6. In this manner, the static context information is able to be defined by, say, a system architect, for example when the application program code is being written, and is then made available to the debugging module 160 for use during debugging of the application program code. In this manner, the debugging module 160 may be able to identify a current context based at least partly on one or more identified active sections and the static context information. As a result a user of the debugging module 160 may not be required to know the specifics of the code she/he is debugging, which is highly advantageous since typically the user (debugger) is not one of, for example, the architect engineers responsible for writing the application that is being debugged. Furthermore, the use of such static context information in this manner, e.g. to enable a current context to be identified, means that a user (debugger) is not required to manually set the correct debug context for each MMU configuration change and code relocation.

Figure 4:
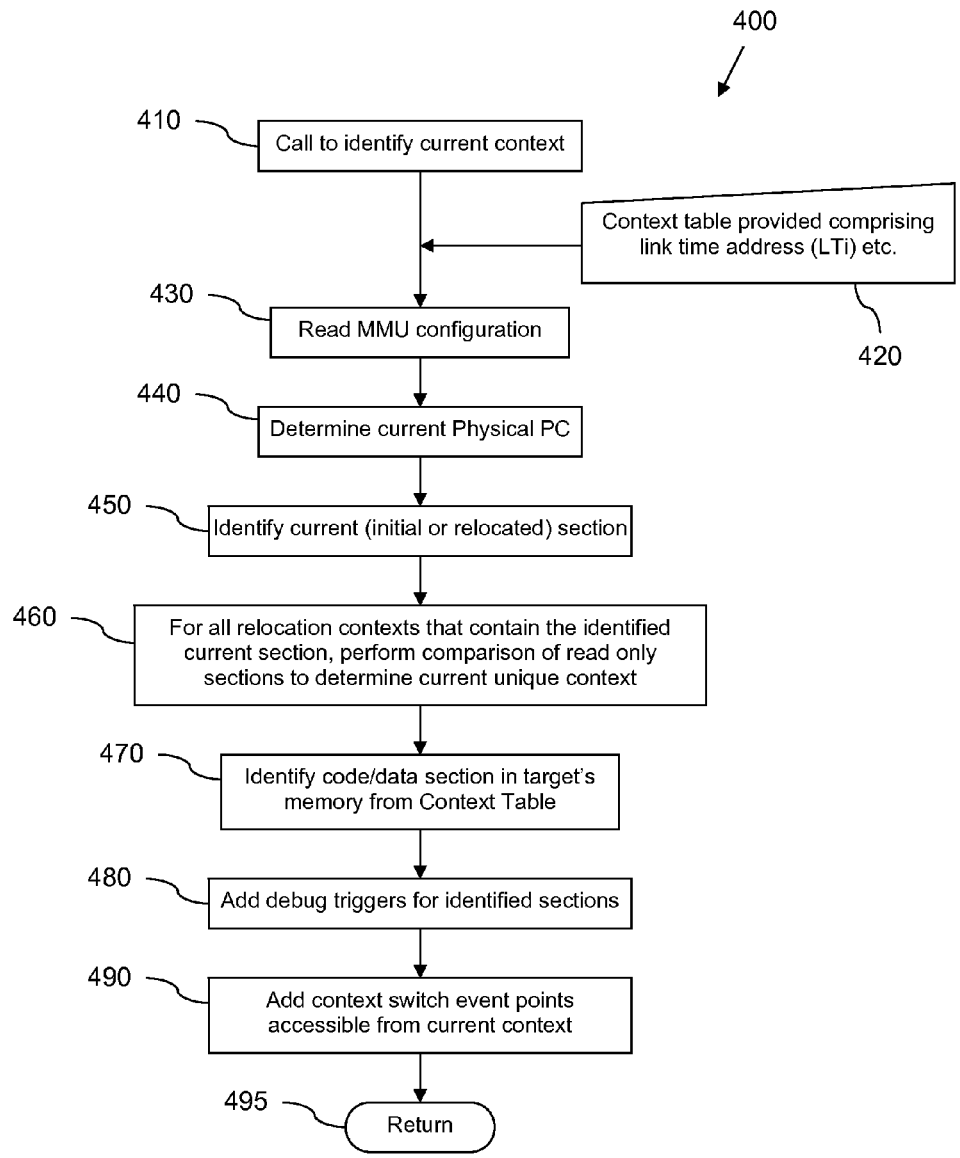
FIG. 4 illustrates a simplified flowchart of an example of a method for identifying a current context during execution of application program code.

Referring now to FIG. 4, there is illustrated a simplified flowchart 400 of an example of a method for identifying a current context during execution of application program code. For example, the method of FIG. 4 may be implemented by signal processing module 165 of debugging module 160 by way of computer-readable code stored within a computer-readable storage element, such as memory element 167.

In summary, the method of FIG. 4 comprises retrieving static context information for the application program code, identifying at least one active section of the application program code loaded in physical memory, and identifying a current context based at least partly on the at least one identified active section and retrieved static context information.

Figure 5:
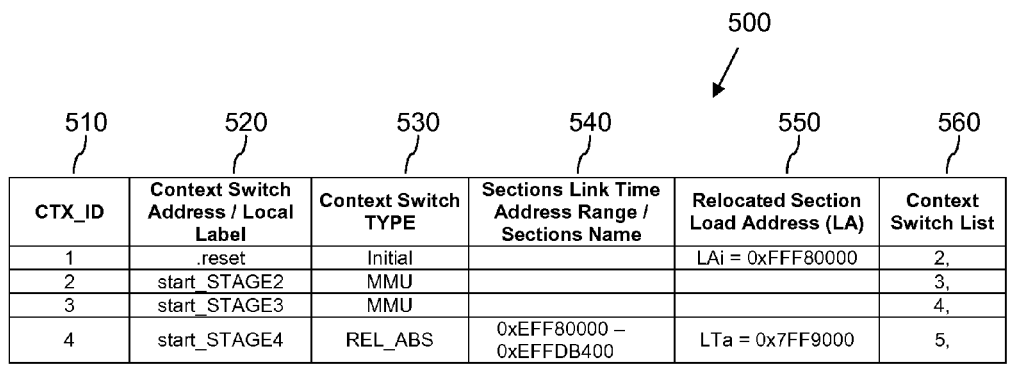
FIGS. 5 and 6 illustrate an example of static context information.

More specifically for the illustrated example, the method starts with a call to identify the current context, at step 410. Next, at step 420, static context information for the application program code is retrieved, for example from memory element 167 of FIG. 1 in a form of a context table an example of which is illustrated in FIG. 5.

Having retrieved the static context information, the method then moves on to identifying at least one active section of the application program code loaded in physical (program) memory. For the illustrated example, this comprises determining a current physical memory program counter value, which for the illustrated example comprises reading the MMU configuration for the signal processing system 100 at step 430, and using the MMU configuration information to convert a virtual memory program counter value into a current physical memory program counter value at step 440. The current physical program counter value is then used to identify an active section of application program code, which for the illustrated example comprises identifying the current active section of application program code in step 450, for example using information within the retrieved static context information Referring to FIG. 5 there is illustrated an example of the static context information, which for the illustrated example comprises a context table 500. In particular, FIG. 5 illustrates an example of uniquely determined relocatable sections of application. The context table 500 comprises information relating to individual contexts for the application program code, each context being allocated a context identifier, illustrated at 510. The context table 500 further comprises physical load addresses of relocatable sections (relocated section load addresses) associated with each context, illustrated at 550. Accordingly, the physical program counter value may be compared to the physical load addresses 550 in the context table 500, in order to identify relocatable sections of application program code that comprise a physical load address range to which the current physical memory program counter value relates.

Figure 6:
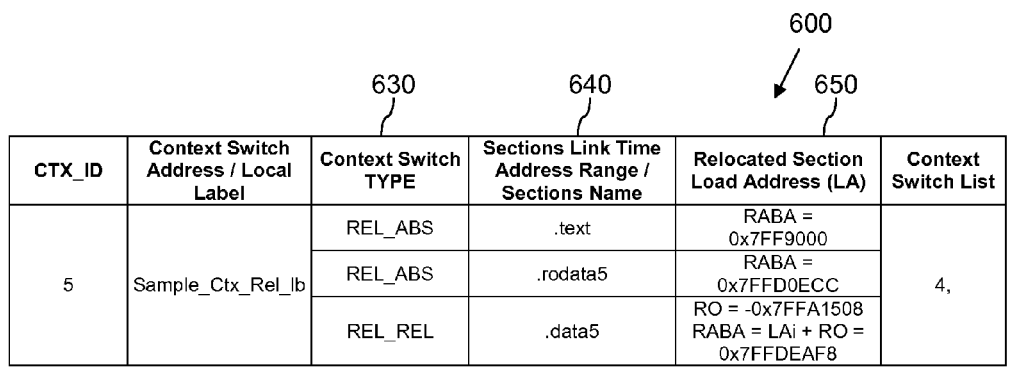

If a plurality of sections of application program code are identified that comprise physical load address ranges to which the current physical memory program counter value relates, for example where overlays are implemented, a comparison may be made of relocated (mapped) application program code to unmapped application code for the identified sections of application program code to identify at least one active (relocated/mapped) section of application program code within program memory. For example, the context table of FIG. 5 comprises link time address ranges for the relocatable sections of application program code, illustrated at 540. The context table may alternatively comprise section names used within the executable file therefor. For example, FIG. 6 illustrates an example of an entry 600 within the context table, for example for the context table 500 of FIG. 5 for a context with which a plurality of sections are associated comprising section names 640 for sections associated with each context 510. For each of the sections of application program code identified as comprising physical load address ranges to which the current physical memory program counter value relates, the corresponding unmapped application program code within, say, an executable file for the application program code being debugged, such as an e_file in accordance with the ELF (Executable and Linkable Format) file format, may be identified. A binary search algorithm may then be implemented to compare the mapped application program code within program memory to unmapped application code within, for example, the executable file, starting from an address in program memory to which the physical program counter value relates and its corresponding link time address for each identified section. In this manner, the specific section of application program code currently mapped into program memory at the address to which the physical memory program counter value relates may be identified. An example of a suitable binary search algorithm may be the 'memcpy( )' function implemented within the C programming language.

Referring back to FIG. 4, having identified an active section of application program code, which for the example described above comprises identifying the current section in step 450, the method moves on to identifying the current context at step 460. For the illustrated example, the method comprises identifying contexts with which the identified active section is associated, and if a plurality of contexts with which the active section is associated is identified, performing a comparison of read only sections to determine the current unique context.

Referring back to FIG. 5, the context table 500 comprises information associating sections of program code with individual contexts. For example, the context table 500 comprises link time addresses 540 (or sections names in the example illustrated in FIG. 6) for sections associated with each context 510. Accordingly, the link time address range, or section name, for the active section of application program code may be used to identify those contexts with which that section of application program code is associated. A comparison of read only sections of application program code (for example '.rodata' and '.text' sections within an ELF file) associated with those identified contexts may then be performed with the corresponding load addresses in program memory for those read only sections, in order to determine which of the identified contexts is the current (active) context.

For example, read only sections of the application program code may be identified within the executable file therefor, such as sections comprising 'rodata' and/or '.text' section types in the case of an ELF executable file. The link time address or section name for each read only section may then be used to identify read only sections associated with an identified context, based on the information provided at 540/640 within the context table 500 for the illustrated example. A binary search algorithm (for example the 'memcpy( )' function implemented within the C programming language) may then be implemented to compare mapped application program code within program memory located at the load addresses for the read only sections associated with the identified context to unmapped application code for the read only sections within, for example, the executable file. In this manner, if the mapped application program code within program memory located at the load addresses for all read only sections associated with a context matches the unmapped application code for those read only sections, it can be determined that that context is the current context.

For the illustrated example, the context table 500 further comprises a context switch list 560 for each context, the context switch list comprising a list of contexts to which the signal processing system 100 may validly switch to. In this manner, and prior to performing a comparison of read only sections associated with each identified context to application program code loaded in program memory to identify the current context, the method may comprise further identifying those contexts, for which a context switch from a previous context is valid, based on the context switch list 560 for the previous context. In this manner, if the current/active section is associated with a large number of contexts, the number of contexts for which a comparison of read only sections is required to be performed may be reduced.

Referring back to FIG. 4, for the illustrated example the method further comprises identifying active sections associated with the current context in step 470 for example by way of information provided within the context table 500. The method further comprises configuring debug triggers for the identified active sections in step 480, and configuring context switch event points accessible from the current context in step 490. In this manner, debug triggers and context switch event points implemented by way of, say, hardware breakpoints and the like need only be configured for the current context switch. Thus, when a context switch occurs, such hardware breakpoints and the like for the previous context are removed, whilst hardware breakpoints and the like for the new context are configured. As a result, limited hardware breakpoint resources available within the signal processing system may be more efficiently utilised during the debugging of application program code comprising context switches. The method then ends at step 495.

Referring back to the example method of FIG. 3, in step 330 it is determined whether the physical memory program counter value matches a preconfigured current context switch event point. The context table 500, for the example illustrated in FIGS. 5 and 6, further comprises a context switch physical link time address or local label 520 for each context switch, in order to indicate the address at which a context switch occurs. For example, a user may compile/link the application that has position independent code and data in, say, one of two ways:
 a) by using the layout of address where the application will be loaded in memory (in this case the physical link time address is the same as the load address, so the address where context switch occurs is equal to the physical link time address); or
 b) by placing the data and program beginning from zero. (In this case the debugger should translate the link time address to initial load address (LAi), so the address where context switch occurs is equal to physical link time address plus initial load address (LAi)).

In some examples, this may be used to determine whether or not the physical memory program counter value matches a current context switch event point.

Furthermore, in step 335 of the example method of FIG. 3, it is determined whether or not the context switch event relates to a memory management (MMU) change or a section relocation. The context table 500, for the example illustrated in FIGS. 5 and 6, further comprises a context switch type indicator 530 for each context to indicate the cause of the context switch. For example, FIGS. 5 and 6 illustrate context switch type indicators, which may comprise one or more of the following values of:
- an 'initial' value, indicating the initial (startup) context for the application program code;
- a 'MMU' value, indicating a context switch caused by an MMU configuration change; and
- a 'REL_ABS' value, indicating a context switch caused by relocation (mapping) of a relocatable section of code into physical memory at an absolute load address; and
- a 'REL_REL' value, indicating a context switch caused by relocation (mapping) of a relocatable section of code into physical memory at a relative (offset) address with respect to, say, an initial load address of the application program code.

Thus, as illustrated in FIG. 5, the section of code associated with the 'initial' context switch type (CTX_ID 1) may comprise as a load address, the initial load address of the application program code (LAi). The contexts resulting from MMU configuration changes (e.g. CTX_ID 2 and CTX_ID 3) do not relate to the relocation (mapping) of sections into physical memory, and as such the link time address fields 540 and load address fields 550 therefor are unpopulated. The section of code associated with the 'REL_ABS' context switch types (e.g. CTX_ID 4) comprises as a load address a 'link time alternate address' (LTa) value. For the example illustrated in FIG. 6, the context is defined by a list of sections. The load address for a section can be specified in two ways: by an absolute value (in this case a 'REL_ABS' context switch type is used) or by using an offset (RO) to the initial load address' (LAi) (in this case a 'REL_REL' context switch type is used). The load address of .text and .rodata sections associated with a 'REL_ABS' context switch types are provided by way of a section's Relocated Absolute Base Address (RABA). For the .data section associated with 'REL_REL' context switch types, the load address is provided by way of a relocated offset (RO) value for that section.

Thus a method for identifying a current context during execution of application program code, a method for determining context information during execution of application program code, and an integrated circuit comprising a debugging module have been described that are particularly suited to application program code comprising context switches. In particular, the methods and modules herein described provide particular benefits for the debugging of application program code comprising context switches whereby debugger information, such as overlay support, is not provided by a compiler or linker for that application program code.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may, for instance, include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via input/output (I/O) devices.

In the foregoing specification, the invention has been described with reference to specific examples of embodiments of the invention. It will, however, be evident that various modifications and changes may be made therein without departing from the broader scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that boundaries between the above described operations are merely illustrative. The multiple operations may be combined into a single operation, which may be distributed in additional operations and such operations may be executed at least partially overlapping in time. Moreover, alternative embodiments may include multiple instances of a particular operation, and the order of operations may be altered in various other embodiments.

Also, for example, the illustrated examples may be implemented as circuitry located on a single integrated circuit or within a same device. For example, the signal process module 110, MMU 120, program memory 130 and/or debugging module 160 of the signal processing system 100 may be located within a single integrated circuit or distributed across any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, examples of the invention are not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for identifying a current context during execution of application program code, comprising:
retrieving physical link time addresses for sections of the application program code;
identifying at least one active section of the application program code loaded in physical memory, wherein the identifying comprises:
determining a current physical memory program counter value; and
comparing the current physical memory program counter value to physical link time addresses for sections of the application program code in order to identify at least one section of application program code that comprise a physical link time address range relating to the current physical memory program counter value; and
identifying a current context based at least partly on the at least one identified active section and retrieved physical link time addresses.

2. The method of claim 1 wherein, if a plurality of sections of application program code are identified that comprise physical link time address ranges to which the current physical memory program counter value relates, the step of identifying at least one active section of the application program code loaded in physical memory further comprises performing a comparison of application program code within physical memory to unmapped application code for the identified sections of application program in order to identify the at least one active section loaded in physical memory.

3. The method of claim 2 wherein performing a comparison of application program code within physical memory to application code for the identified sections of application program code comprises performing a binary search algorithm starting from an address in physical memory to which the physical memory program counter value relates.

4. The method claim 1 wherein, upon identifying the current context, the method further comprises at least one of:
identifying active sections associated with the current context, and configuring debug triggers for the identified active sections; and
configuring context switch event points accessible from the current context.

5. The method of claim 1, further comprising:
receiving an event notification;
determining whether the received event notification relates to a context switch event; and
if it is determined that the received event notification relates to a context switch event, updating context information based at least partly on the determined current context.

6. The method of claim 5 wherein determining whether the received event notification relates to a context switch event comprises obtaining a physical memory program counter value, and determining whether the physical memory program counter value matches a current context switch event point.

7. The method of claim 5 wherein, if it is determined that the received event notification relates to a context switch event, the method further comprises:
determining whether the context switch event relates to a memory management unit (MMU) change;
if it is determined that the context switch event relates to an MMU change, reading MMU configuration information; and
if it is determined that the context switch event does not relate to an MMU change, updating a relocated sections list.

8. The method of claim 5 wherein, if it is determined that the received event notification relates to a context switch event, the method further comprises at least one of:

configuring debug triggers in accordance with the current context; and configuring context switch event points accessible from the current context.

9. An integrated circuit comprising a debugging module for providing debugging functionality during execution of application program code within a processing system, the debugging module comprising a processor arranged to:

retrieve physical link time addresses for sections of the application program code;

identify at least one active section of the application program code loaded in physical memory of the processing system that is executing the application program code, and to identify the at least one active section, the processor is further arranged to:

determine a current physical memory program counter value; and compare the current physical memory program counter value to physical link time addresses for sections of the application program code in order to identify at least one section of application program code that comprise a physical link time address range relating to the current physical memory program counter value; and identify a current context based at least partly on the at least one identified active section and retrieved physical link time addresses.

10. The circuit of claim 9 wherein, if a plurality of sections of application program code are identified that comprise physical link time address ranges to which the current physical memory program counter value relates, to identify the at least one active section of the application program code loaded in physical memory, the processor is further arranged to perform a comparison of application program code within physical memory to unmapped application code for the identified sections of application program in order to identify the at least one active section loaded in physical memory.

11. The circuit of claim 10 wherein to perform a comparison of application program code within physical memory to application code for the identified sections of application program code, the processor is further arranged to perform a binary search algorithm starting from an address in physical memory to which the physical memory program counter value relates.

12. The circuit of claim 9 wherein, upon identifying the current context, the processor is further arranged to perform at least one of:

identify active sections associated with the current context, and configuring debug triggers for the identified active sections; and configure context switch event points accessible from the current context.

\* \* \* \* \*